United States Patent [19]

Nash

[11] 4,265,471

[45] May 5, 1981

[54] PIPE JOINT

[75] Inventor: David D. Nash, Brownhills, England

[73] Assignee: Durapipe Limited, Staffordshire, United Kingdom

[21] Appl. No.: 11,854

[22] Filed: Feb. 13, 1979

[51] Int. Cl.³ .............................................. F16L 17/04
[52] U.S. Cl. ................................. 285/111; 285/365; 285/373; 285/421
[58] Field of Search ............... 285/421, 373, 364–367, 285/407–410, 111, 419, 423, 233, 374

[56] References Cited

U.S. PATENT DOCUMENTS

| 3,186,744 | 1/1965 | Smith et al. | 285/421 X |
| 3,565,465 | 2/1971 | Wemyss | 285/374X |
| 4,035,005 | 7/1977 | Devincent et al. | 285/351 X |
| 4,147,383 | 4/1974 | Schluter | 285/421 X |

FOREIGN PATENT DOCUMENTS 886133  1/1962  United Kingdom ..................... 285/365

Primary Examiner—Dave W. Arola

Attorney, Agent, or Firm—Shlesinger & Arkwright, Garvey & Dinsmore

[57] ABSTRACT

There is disclosed a pipe joint comprising a first pipe having an end portion engaged as a snug fit in a concentric end portion of a second pipe. The pipes have, at positions spaced from their adjacent ends, external annular ribs with corresponding internal annular grooves, an annular seal being accommodated in the annular groove of the outer pipe between the outer pipe and the inner pipe.

A clamping ring which spans the annular ribs of the two pipes comprises two arcuate parts connected end to end by a hinge and having at their ends remote from the hinge outwardly turned edge formations which are received in a wedge-shaped channel member and engage relatively inclined opposing side walls of the channel member. The clamping ring can simply be closed around the pipe joint by relative pivoting of the two arcuate parts and can be retained by sliding the wedging member, in a direction parallel with the axis of the pipe joint, over the edge formations at the ends of the arcuate parts remote from the hinge.

3 Claims, 4 Drawing Figures

PIPE JOINT

THIS INVENTION relates to pipe joints and is particularly, but not exclusively, applicable to the formation of joints between rigid thermo-plastics material.

It is known to effect joints between the ends of rigid thermo-plastics pipes in various ways, for example by the use of solvent cements or by fitting injection moulded end fittings to the pipes, and joining the pipes by securing the respective end fittings together by appropriate securing means.

The use of solvent cements to form joints between rigid thermo-plastics pipes prevents subsequent disassembly of the parts cemented together without damage, entails an inevitable lapse of time before a joint is ready for service and is not practicable with some types of thermo-plastics materials. Furthermore, unless end fittings are employed, it is difficult to provide, by the use of solvent cements, and end-to-end joint between thermo-plastics pipes of the same diameter which has adequate strength to resist axial forces between the pipes connected or to resist transverse bending forces applied to a joint. The use of injection moulded end fittings may avoid this disadvantage but of course entails additional expense.

It is an object of the present invention to provide an improved pipe joint by means of which the above noted disadvantages may be avoided and which is simple and economical in construction.

According to the invention there is provided a mechanical joint between two pipes wherein an end portion of a first said pipe is received snugly within an end portion of the second said pipe, each said pipe being provided externally, at a location spaced from the end thereof afforded by the respective end portion, with an annular rib extending around the pipe and coaxial therewith, the pipes being retained against axial separation by a clamping ring encircling the two pipes at the joint and spanning said annular ribs of the two pipes, the clamping ring having at opposite axial ends thereof respective flanges extending in directions towards the axis of the pipes, each said flange engaging that flank of a respective one of said annular ribs which is furthest from the other of said annular ribs.

Preferably at least the said second pipe has an internal annular groove at an axial position corresponding to the external annular rib thereon and the relative lengths of said end portions of the two pipes are such that said end portion of said first pipe extends at least partly across said annular groove in the said second pipe and an annular seal is disposed in the annular space defined between the wall of said annular groove in said second pipe and the adjacent part of the exterior of said end portion of the first pipe.

The clamping ring is preferably formed of two arcuate parts flexibly connected at their one ends, for example by a hinge arrangement and provided at their other ends with formations which, in the assembled joint, are engaged by a channel-shaped wedging member slid over said formations in a direction substantially parallel with the longitudinal axes of the pipes at the joint.

The flanks of said annular ribs engaged by the flanges of the clamping ring are preferably inclined with respect to the axis of the pipe joint and the flanges of the clamping ring correspondingly inclined in such a way that a circumferential clamping force applied to the clamping ring acts to wedge the two pipes towards each other.

An embodiment of the invention is described below with reference to the accompanying drawings in which.

Figure 1:
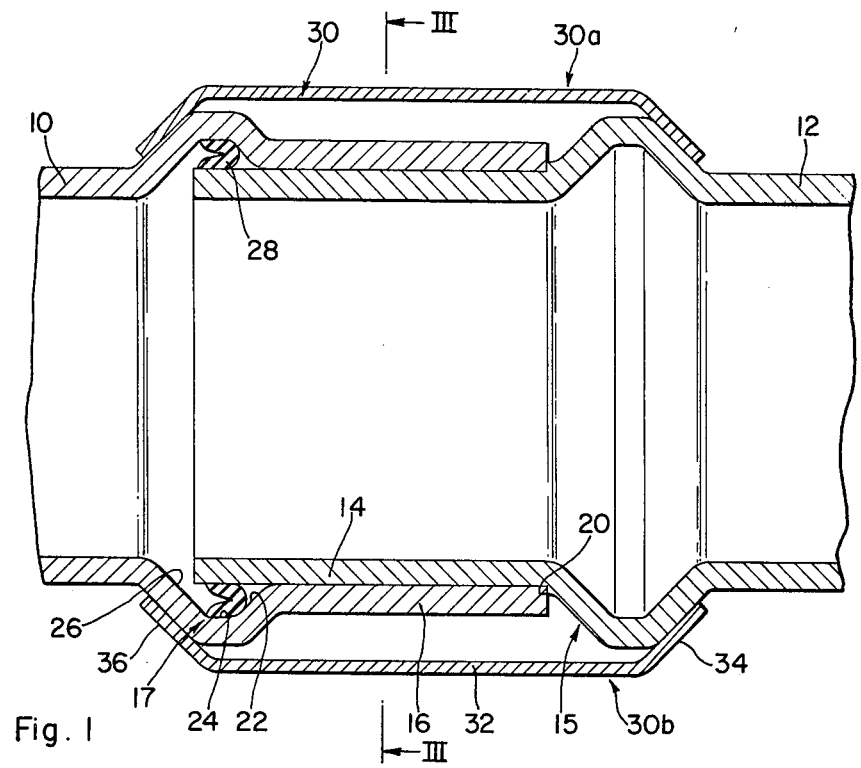
FIG. 1 is a view in axial section of a pipe joint embodying the invention.

Referring to FIG. 1, a joint between the ends of two cylindrical pipes 10 and 12 of rigid thermoplastics material is effected by deforming respective end portions of the pipes 10 and 12, whilst softened under the action of heat, to the respective forms shown, so that the pipe 12 has a cylindrical end portion 14 which is of the same diameter as the major portion of the pipe 12 and is separated from the major portion of the pipe 12 by an annular deformation 15 while the pipe 10 has a cylindrical end portion 16 of a diameter greater than that of the major part of the pipe 10 and having an internal diameter such that the end portion 14 can be fitted snugly within the end portion 16 as shown in FIG. 1. The end portion 16 is separated from the major portion of the pipe 10 by an annular deformation 17.

Each of the annular deformations 15, 17 provides, on the exterior of the respective pipe 12, 10, a respective annular rib having at its crest an axially short cylindrical external surface substantially coaxial with the pipe and conically sloping flanks extending respectively from the crest to the cylindrical surface of the major part of the pipe and from the crest towards the respective end portion 14 or 16. Similarly, each annular deformation 15, 17 provides on its interior an annular groove of a form complementary with that of the rib on the exterior of the respective pipe.

Thus each said annular groove comprises an axially short surface which is cylindrical about the axis of the respective pipe 10, 12 and forms the bottom of the groove, and conically inclined walls extending respectively from the bottom of the groove to the major portion of the respective pipe and to the end portion of the respective pipe. In FIG. 1, the bottom of the groove provided by deformation 17 is indicated at 24, the conically inclined wall extending to the major portion of tube 10 is indicated at 26 and the conically inclined wall extending to the end portion 14 is indicated at 22.

It will be noted that the annular deformation 15 on the pipe 12 provides, in the region of the transition from the end portion 14 to the annular deformation 15, a radially extending shoulder 20 on the exterior of the pipe and facing towards the free end of the end portion 14. The free end of the end portion 16 of pipe 10 abuts this shoulder 20 to limit movement of the pipes 10 and 12 towards each other as shown in FIG. 1.

The relative lengths of the end portions 14 and 16 are such that, in the position shown in FIG. 1, the end portion 14, on the interior of the pipe 10, extends partially over the annular groove provided by the deformation 17 and, in particular, extends over the conically inclined wall 22 of this groove, further extends over the bottom 24 of this groove and partly over the other conically inclined wall 26 of this groove. There is thus defined between the end part of the end portion 14 and the groove provided by the annular deformations 17 an annular recess in which is accommodated an annular elastomeric seal 28 which is generally U-shaped in half axial section with the channel defined between the arms of the U facing towards the conically sloping wall 26. The radially outer arm of the U fits snugly against the bottom 24 of the groove provided by deformation 17 whilst the other limb of the U bears snugly against the cylindrical external surface of the end portion 14.

Figure 3:
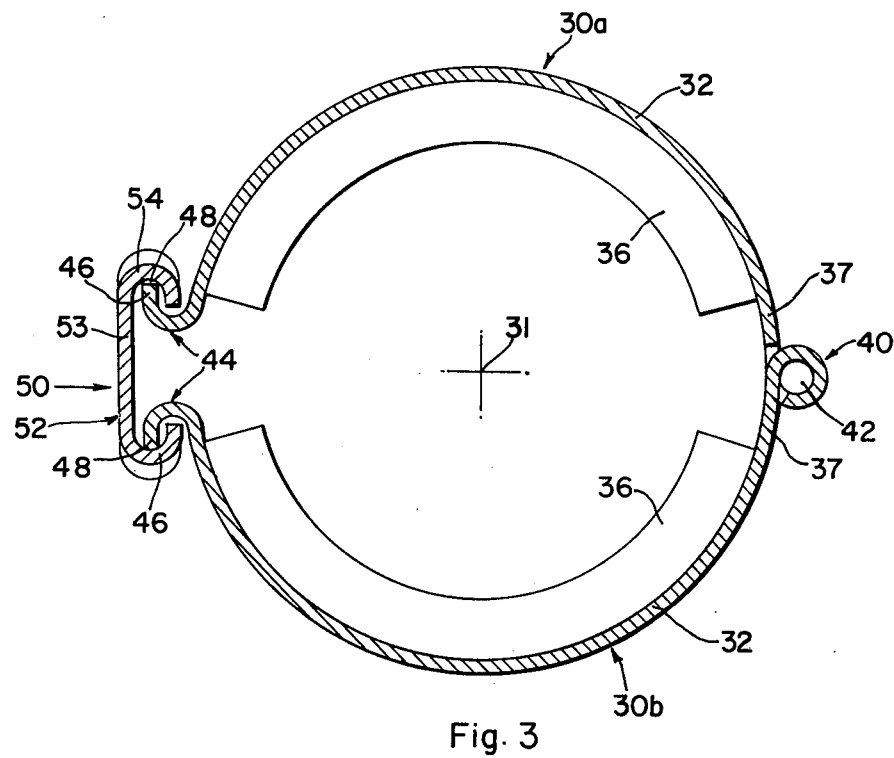
FIG. 3 is a cross-sectional view, as seen along the line III—III in FIG. 1, of the clamping ring and wedging member only, forming part of the pipe joint of FIGS. 1 and 2.

The two pipes 10 and 12 are held together in the joint by a clamping ring 30 which extends around the joint and spans both deformations 15 and 17. Referring to FIG. 3, the clamping ring 30 comprises two similar arcuate parts 30a and 30b which are formed as pressings in sheet steel and which are pivotally connected by a hinge arrangement 40. Each said arcuate part includes a major, part cylindrical portion 32, the axis of curvature of the part cylindrical portion being parallel with the pivotal axis of hinge arrangement 40, the axes of curvature of portions 32 being coincident in the position shown in FIG. 3 and being indicated at 31 in FIG. 3.

Over the major part of the angular extent of each portion 32 about its axis of curvature, part conical flanges 34, 36 are provided at axially extreme ends of the portion 32, the axis of curvature of these part conical flanges corresponding with that of the respective portion 32, and the flanges 34, 36 extending from the respective portion 32 towards the axis of curvature of the latter.

Thus each arcuate part 30a, 30b provides on its concave side, a segment of an annular channel about the axis of curvature of the respective portion 32, the channel being open towards the last mentioned axis. When the clamping ring is in its closed position around the pipes 10, 12, the axes of curvature of the portions 32 of the parts 30a, 30b substantially coincide with each other and with the axis of the pipes 10, 12 so that the parts 30a, 30b provide respective segments of the same annular channel about the axis of the joint and which channel receives the ribs provided by annular deformations 15 and 17. As shown in FIG. 1, the major part of the axial length of the clamping ring is provided by the cylindrical portions 32, which in the assembled joint are substantially coaxial with the pipes 10 and 12, extend from the deformation 15 to the deformation 17 and are spaced radially outwardly therefrom, the conically inclined flanges 34 and 36, bearing against the ribs provided by deformations 15 and 17 respectively. The flange 36 has the same inclination with respect to the axis of the pipe joint as the sloping flank of the deformation 17 which is furthest from the deformation 15 and bears against the external surface provided by the last mentioned flank. Similarly, the flange 34 has the same inclination as that flank of the annular deformation 15 which is furthest from the deformation 17 and the flange 34 bears against the external surface presented by the last mentioned flank. It will be appreciated that by virtue of the inclination of the flanges 34, 36 and the flanks of the deformations 15, 17 against which they bear, a circumferential tension in the clamping ring 30 will give rise to forces urging the end portion 14 further into the pipe 10 and thus urging the end face of the end portion 16 towards engagement with the shoulder 60. Thus forces urging the pipes 10 and 12 axially towards each other are absorbed compressively by abutment of the end face of portion 16 with the shoulder 20 whilst forces tending to separate the pipes 10 and 12 axially are absorbed by the steel clamping ring 30.

Figure 4:
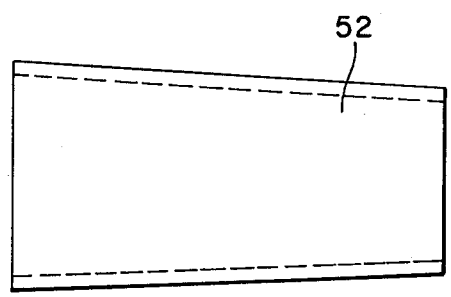
FIG. 4 is a side elevation view of a wedging member used to secure the clamping ring.

Referring again to FIG. 3, at the circumferential end of each arcuate part 30a, 30b adjacent the hinge arrangement 30, the portion 32 is extended beyond the adjacent circumferential ends of the flanges 34, 36 and is bent at its end to form, with the correspondingly bent end of the portion 32 of the other arcuate part and a hinge pin 42, the hinge arrangement 40. The hinge arrangement 40 allows the clamping ring to be opened to allow it to be slipped over an assembled pipe joint and thereafter closed about the joint. The manner in which the clamping ring is held closed about the pipe joint is illustrated in FIGS. 3 and 4. At the circumferential end of each arcuate part 30a, 30b remote from the hinge arrangement 40, the respective portion 32 is extended beyond the adjacent circumferential ends of the respective flanges 34, 36 and the extended portion is bent outwardly in a reverse sense to the curvature of the respective arcuate part, to provide a generally channel shaped formation 44 running generally parallel with the axis of curvature of the respective portion 32, the wall 46 of each channel formation 44 which is furthest from the hinge arrangement 40 terminating in a respective free edge 48. The edges 48 of the walls 46 of the two arcuate parts are so formed that when the clamping ring is in its closed position, with the relative positions of the parts 30a, 30b being as shown in FIG. 3, the free edges 48, as viewed in the direction of the arrow 50 in FIG. 3 are inclined equally but in opposite senses, with respect to the direction of the axes of curvature of the respective arcuate part 30a, 30b. Thus, in the closed position of the clamping ring illustrated in FIG. 3 the edges 48 slope towards each other from one axial end of the clamp to the other, as viewed in the direction of arrow 50 in FIG. 3.

The clamping ring is held clamped circumferentially around the joint by means of a generally channel-section member 52, the member 52 having a flat wall 53 forming the base of the channel and side walls 54 which, as viewed in cross section in FIG. 3, are curved so as to extend towards each other at their free ends so that the channel is narrower at its mouth than at the position intermediate its mouth and its base. Each side wall 54 is of substantially uniform cross section from one end of the member 52 to the other but the width of the base 53 of the channel tapers from one end of the member 52 to the other and the directions of longitudinal extension of the two side walls 54 are correspondingly inclined with respect to each other in the longitudinal direction of the channel as shown in FIG. 4, the mutual inclination of the directions of longitudinal extension of the side walls corresponding to the mutual inclination of the edges 48 in the closed position of the clamping ring.

When the clamping ring has been closed about a pipe joint, the wedging member 52 is slid over the flanges 46 in a longitudinal direction parallel with the axis of the joint, the widest part of the channel provided by member 52 being engaged over the flanges 46 at the axial end where the free edges 48 of these are closest and the member 52 thereupon slid in the axial direction, the edges 48 bearing against the inner surfaces of the side walls 54 and thereby being wedged towards each other as the clamping member is slid along, the clamping member being retained by the inwardly turned free edge parts of the side walls 54 engaging in the channels provided by the formations 44.

In the joint of FIG. 1, the conically sloping flanks of the deformations 15, 17 and the corresponding flanges 34, 36 are inclined at 45° with respect to the axis of the pipe joint. A pipe joint of FIG. 2 corresponds in structure to that of FIG. 1 except that, in the joint of FIG. 2, the flanks of the deformations 15, 17 and the correspondingly inclined flanges 34, 36 are inclined at 30° with respect to the axis of the pipe joint.

It will be noted from FIG. 1 that any internal fluid pressure within a pipe system incorporating the joint of FIG. 1 or FIG. 4 will tend to urge apart the lips of the sealing member 28 providing the respective limbs of the U-section, and will also tend to urge the seal into a narrowing part of the annular space accommodating the member 28, said narrowing part being defined between the inclined wall 22 and the exterior of portion 14. The seal is thus urged more firmly into contact with the surfaces with which it is intended to make sealing engagement, thus ensuring good sealing.

Figure 2:
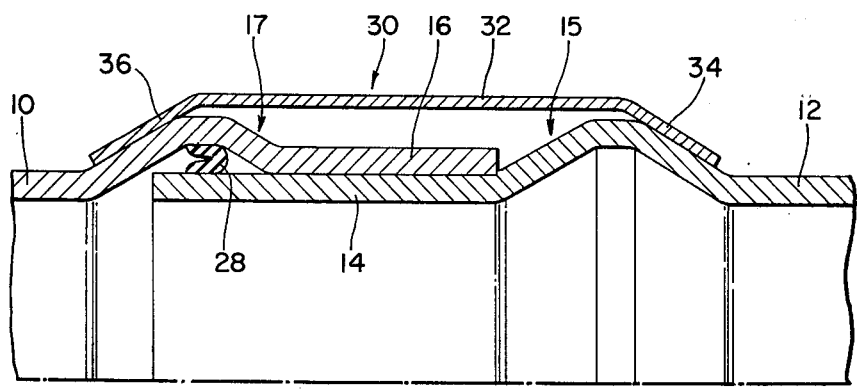
FIG. 2 is a view in half axial section of a modified pipe joint embodying the invention.

It will be appreciated that, although an internal pressure within a pipe system incorporating the joint shown in FIG. 1 or FIG. 2 will produce a force tending to separate the pipes 10 and 12 axially, such a force will be counteracted, as explained previously, by the clamping ring 30.

Furthermore, the axial length of the surfaces of end portions 14 and 16 which are in mutual engagement in the assembled pipe joint is sufficient to afford a high degree of rigidity to the joint to withstand transverse bending stresses. The axial length of the last-mentioned surfaces also affords self alignment of the pipes 10 and 12 in the joint.

In addition, the joint described has the advantage of being readily assembled and just as readily disassembled without damage to any of the parts of the joint.

It should be appreciated that the above description, with reference to the drawings, of pipe joints embodying the invention is given by way of non-limitative example only, and that this applies particularly to the clamping ring construction described with reference to FIGS. 3 and 4. The clamping ring may take any of a variety of other possible forms consistent with its function, particularly as regards the provision made for opening the ring sufficiently to position it over the pipe joint and the means employed for tensioning the ring circumferentially. However, the general sectional shape of the clamping ring illustrated in FIGS. 1 and 2 is preferred for pipe joints having the form illustrated in those FIGURES.

I claim:

1. A mechanical pipe joint comprising,
   a first pipe having an end portion defining one end of the first pipe,
   a second pipe having an end portion within which said end portion of said first pipe is snugly-received, said end portion of said second pipe defining one end of said second pipe,
   each said pipe having, on its exterior, a raised annular rib extending around the pipe and coaxial therewith, each said rib being at a location spaced from the end of the respective pipe defined by the respective end portion,
   said first pipe having shoulder means on its outer surface adjacent the respective rib for positioning the terminal end of said second pipe and thereby limiting movement of the first and second pipes toward each other,
   said joint further including a clamping ring encircling the two pipes and spanning said annular ribs of the two pipes, said clamping ring including a respective flange, extending toward the axis of the pipes and provided at each of the two axial ends of the clamping ring,
   each said flange engaging that flank of a respective one of said annular ribs which is furthest from the other of said annular ribs,
   each second pipe having an internal annular groove at an axial position corresponding to the external annular rib thereon,
   said end portion of said first pipe extending at least partly across said annular groove in said second pipe to define an annular space between the wall of said annular groove in said second pipe and the adjacent part of the exterior of said end portion of the first pipe,
   and an annular seal disposed in said annular space.

2. The joint of claim 1 wherein the clamping ring comprises two arcuate parts, pivotal connection means connecting one end of one said arcuate part to one end of the other said annular part,
   a respective retaining formation at the other end of each said arcuate part,
   and a channel-shaped wedging member engaging said retaining formations of the two arcuate parts,
   co-operating surfaces on said wedging member and said retaining formations extending in directions inclined to the direction of the axis of the joint whereby by thrusting said wedging member in one direction parallel to the axis of the joint the clamping ring can be caused to exert a circumferential clamping effect.

3. A joint according to claim 1 or 2 in which the flanks of said annular ribs engaged by the flanges of said clamping ring are inclined with respect to the axis of the pipe joint and the flanges of the clamping ring are correspondingly inclined whereby a circumferential clamping force applied to the clamping ring acts to wedge said two pipes towards each other.

* * * * *